(12) United States Patent
Shaw et al.

(10) Patent No.: US 12,353,635 B2
(45) Date of Patent: Jul. 8, 2025

(54) METHOD AND SYSTEM FOR GESTURE RECOGNITION

(71) Applicant: JPMorgan Chase Bank, N.A., New York, NY (US)

(72) Inventors: Andrew Shaw, Glasglow (GB); Vlad Zaharovs, Glasgow (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 190 days.

(21) Appl. No.: 17/954,004

(22) Filed: Sep. 27, 2022

(65) Prior Publication Data

US 2023/0112268 A1  Apr. 13, 2023

Related U.S. Application Data

(60) Provisional application No. 63/253,269, filed on Oct. 7, 2021.

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01)

(58) Field of Classification Search
None
See application file for complete search history.

(56) References Cited

U.S. PATENT DOCUMENTS

| | | | |
|---|---|---|---|
| 2010/0246847 A1* | 9/2010 | Johnson, Jr. | H04R 1/1041 341/20 |
| 2014/0143738 A1* | 5/2014 | Underwood, IV | H04L 51/00 715/863 |
| 2018/0338720 A1* | 11/2018 | Gupta | A61B 5/6824 |

\* cited by examiner

*Primary Examiner* — Parul H Gupta
(74) *Attorney, Agent, or Firm* — GREENBLUM & BERNSTEIN P.L.C.

(57) ABSTRACT

A method for facilitating gesture recognition via a wearable device is disclosed. The method includes receiving sensor data from a sensor device that is incorporated into the wearable device; identifying an orientation based on the sensor data, the orientation relating to a relative position of the wearable device; determining, via an application programming interface, a gesture based on the orientation; mapping the gesture to a predetermined action; and initiating, via a communication interface, the predetermined action in an associated computing device based on a result of the mapping.

12 Claims, 4 Drawing Sheets

METHOD AND SYSTEM FOR GESTURE RECOGNITION

CROSS-REFERENCE TO RELATED APPLICATIONS

This application claims the benefit of U.S. Provisional Patent Application Ser. No. 63/253,269, filed Oct. 7, 2021, which is hereby incorporated by reference in its entirety.

BACKGROUND

1. Field of the Disclosure

This technology generally relates to methods and systems for recognizing gestures, and more particularly to methods and systems for facilitating gesture recognition via a wearable device to initiate actions on an associated computing device.

2. Background Information

Many users rely on a variety of peripheral devices to interact with computing devices. Often, the peripheral devices require manual manipulation via the hands of the user and/or audible commands to initiate a desired action. Historically, implementation of conventional peripheral devices has resulted in varying degrees of success with respect to initiating a desired user action in a hands-free and voice-free environment.

One drawback of using conventional peripheral devices to interact with the computing devices is that in many instances, the functionalities of the conventional peripheral devices are limited in hands-free and voice-free operating environments. As a result, user experience may be greatly diminished. Additionally, inputs of the conventional peripheral devices may be highly susceptible to environmental factors. For example, performance of voice commands may be drastically reduced in a loud office environment.

Therefore, there is a need to facilitate gesture recognition via a wearable user device to initiate actions on an associated computing device in a hands-free and voice-free operating environment.

SUMMARY

The present disclosure, through one or more of its various aspects, embodiments, and/or specific features or sub-components, provides, inter alia, various systems, servers, devices, methods, media, programs, and platforms for facilitating gesture recognition via a wearable device to initiate actions on an associated computing device.

According to an aspect of the present disclosure, a method for facilitating gesture recognition via a wearable device is disclosed. The method is implemented by at least one processor. The method may include receiving sensor data from at least one sensor device that is incorporated into the wearable device; identifying at least one orientation based on the sensor data, the at least one orientation may relate to a relative position of the wearable device; determining, via an application programming interface, at least one gesture based on the at least one orientation; mapping the at least one gesture to at least one predetermined action; and initiating, via a communication interface, the at least one predetermined action in an associated computing device based on a result of the mapping.

In accordance with an exemplary embodiment, the wearable device may include at least one from among a set of wired headphones, a set of wireless headphones, a pair of smart eyeglasses, and a smart watch.

In accordance with an exemplary embodiment, the at least one sensor device may include at least one from among a gyroscope, a magnetometer, and an accelerometer.

In accordance with an exemplary embodiment, the at least one gesture may include at least one from among a tilt gesture, a rotate gesture, and a shake gesture.

In accordance with an exemplary embodiment, the at least one predetermined action may include at least one from among a load document action, an undo action, a scroll page action, a select annotation tool action, and a file transfer action.

In accordance with an exemplary embodiment, the method may further include receiving, via a graphical user interface, at least one request from a user, the at least one request may include at least one new predetermined action and mapping information; mapping, by using the mapping information, the at least one new predetermined action to the at least one gesture; generating at least one notification, the at least one notification may include data that relates to at least one from among the at least one new predetermined action, the mapping information, and a result of the mapping; and displaying, via the graphical user interface, the at least one notification in response to the at least one request.

In accordance with an exemplary embodiment, the method may further include aggregating the sensor data from a plurality of users; requesting, via a graphical user interface, feedback data from each of the plurality of users, the feedback data may include an accuracy rating for the identified at least one orientation and the determined at least one gesture; generating at least one training data set based on the sensor data and the feedback data, the at least one training data set may include data that is enriched by using data labeling and data annotation; training at least one model by using the at least one training data set; and automatically evaluating the trained at least one model based on at least one metric.

In accordance with an exemplary embodiment, the method may further include identifying, by using the trained at least one model, the at least one orientation based on the sensor data; and determining, by using the trained at least one model, the at least one gesture based on the at least one orientation.

In accordance with an exemplary embodiment, the at least one model may include at least one from among a machine learning model, a mathematical model, a process model, and a data model.

According to an aspect of the present disclosure, a computing device configured to implement an execution of a method for facilitating gesture recognition via a wearable device is disclosed. The computing device including a processor; a memory; and a communication interface coupled to each of the processor and the memory, wherein the processor may be configured to receive sensor data from at least one sensor device that is incorporated into the wearable device; identify at least one orientation based on the sensor data, the at least one orientation may relate to a relative position of the wearable device; determine, via an application programming interface, at least one gesture based on the at least one orientation; map the at least one gesture to at least one predetermined action; and initiate, via a communication interface, the at least one predetermined action in an associated computing device based on a result of the mapping.

In accordance with an exemplary embodiment, the wearable device may include at least one from among a set of wired headphones, a set of wireless headphones, a pair of smart eyeglasses, and a smart watch.

In accordance with an exemplary embodiment, the at least one sensor device may include at least one from among a gyroscope, a magnetometer, and an accelerometer.

In accordance with an exemplary embodiment, the at least one gesture may include at least one from among a tilt gesture, a rotate gesture, and a shake gesture.

In accordance with an exemplary embodiment, the at least one predetermined action may include at least one from among a load document action, an undo action, a scroll page action, a select annotation tool action, and a file transfer action.

In accordance with an exemplary embodiment, the processor may be further configured to receive, via a graphical user interface, at least one request from a user, the at least one request may include at least one new predetermined action and mapping information; map, by using the mapping information, the at least one new predetermined action to the at least one gesture; generate at least one notification, the at least one notification may include data that relates to at least one from among the at least one new predetermined action, the mapping information, and a result of the mapping; and display, via the graphical user interface, the at least one notification in response to the at least one request.

In accordance with an exemplary embodiment, the processor may be further configured to aggregate the sensor data from a plurality of users; request, via a graphical user interface, feedback data from each of the plurality of users, the feedback data may include an accuracy rating for the identified at least one orientation and the determined at least one gesture; generate at least one training data set based on the sensor data and the feedback data, the at least one training data set may include data that is enriched by using data labeling and data annotation; train at least one model by using the at least one training data set; and automatically evaluate the trained at least one model based on at least one metric.

In accordance with an exemplary embodiment, the processor may be further configured to identify, by using the trained at least one model, the at least one orientation based on the sensor data; and determine, by using the trained at least one model, the at least one gesture based on the at least one orientation.

In accordance with an exemplary embodiment, the at least one model may include at least one from among a machine learning model, a mathematical model, a process model, and a data model.

According to an aspect of the present disclosure, a non-transitory computer readable storage medium storing instructions for facilitating gesture recognition via a wearable device is disclosed. The storage medium including executable code which, when executed by a processor, may cause the processor to receive sensor data from at least one sensor device that is incorporated into the wearable device; identify at least one orientation based on the sensor data, the at least one orientation may relate to a relative position of the wearable device; determine, via an application programming interface, at least one gesture based on the at least one orientation; map the at least one gesture to at least one predetermined action; and initiate, via a communication interface, the at least one predetermined action in an associated computing device based on a result of the mapping.

In accordance with an exemplary embodiment, the wearable device may include at least one from among a set of wired headphones, a set of wireless headphones, a pair of smart eyeglasses, and a smart watch.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
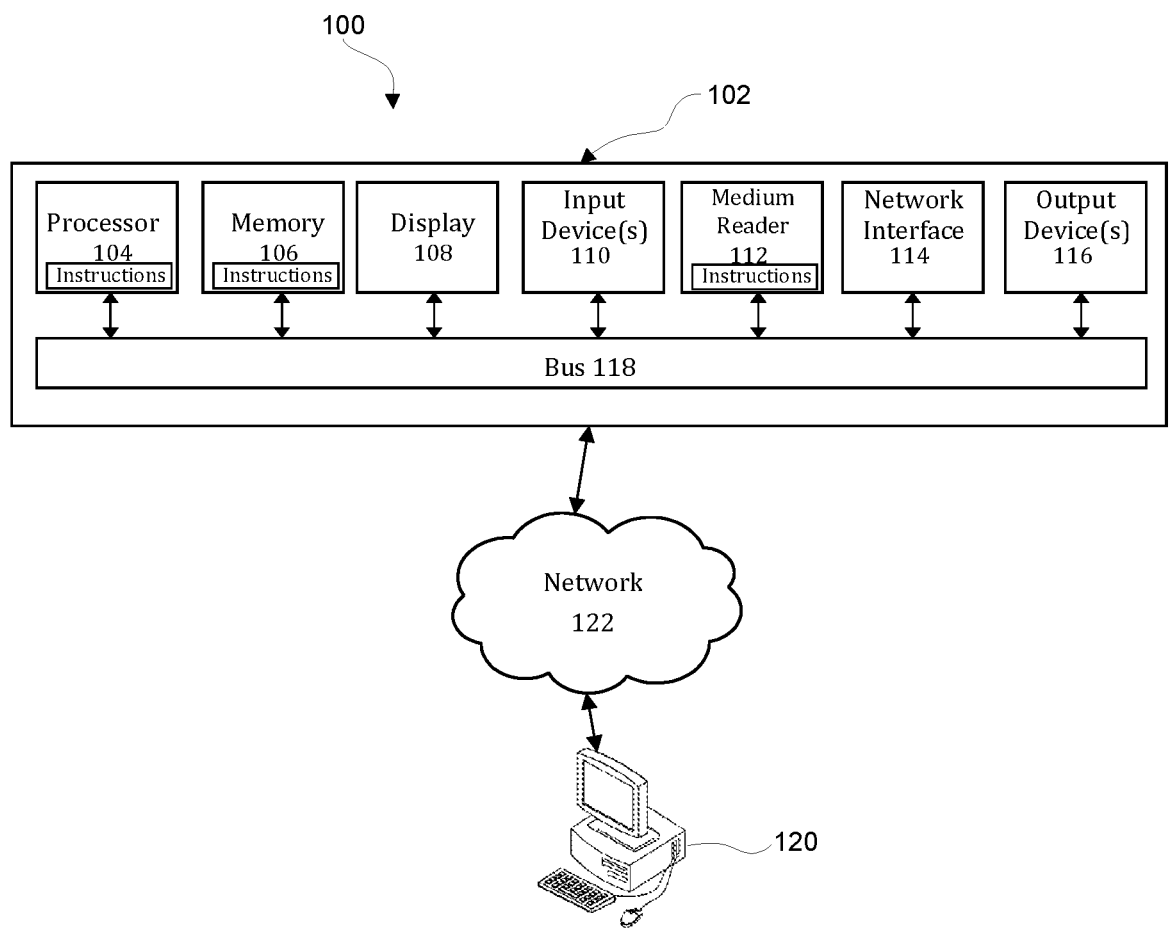
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons of ordinary skill in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating gesture recognition via a wearable device to initiate actions on an associated computing device.

Figure 2:
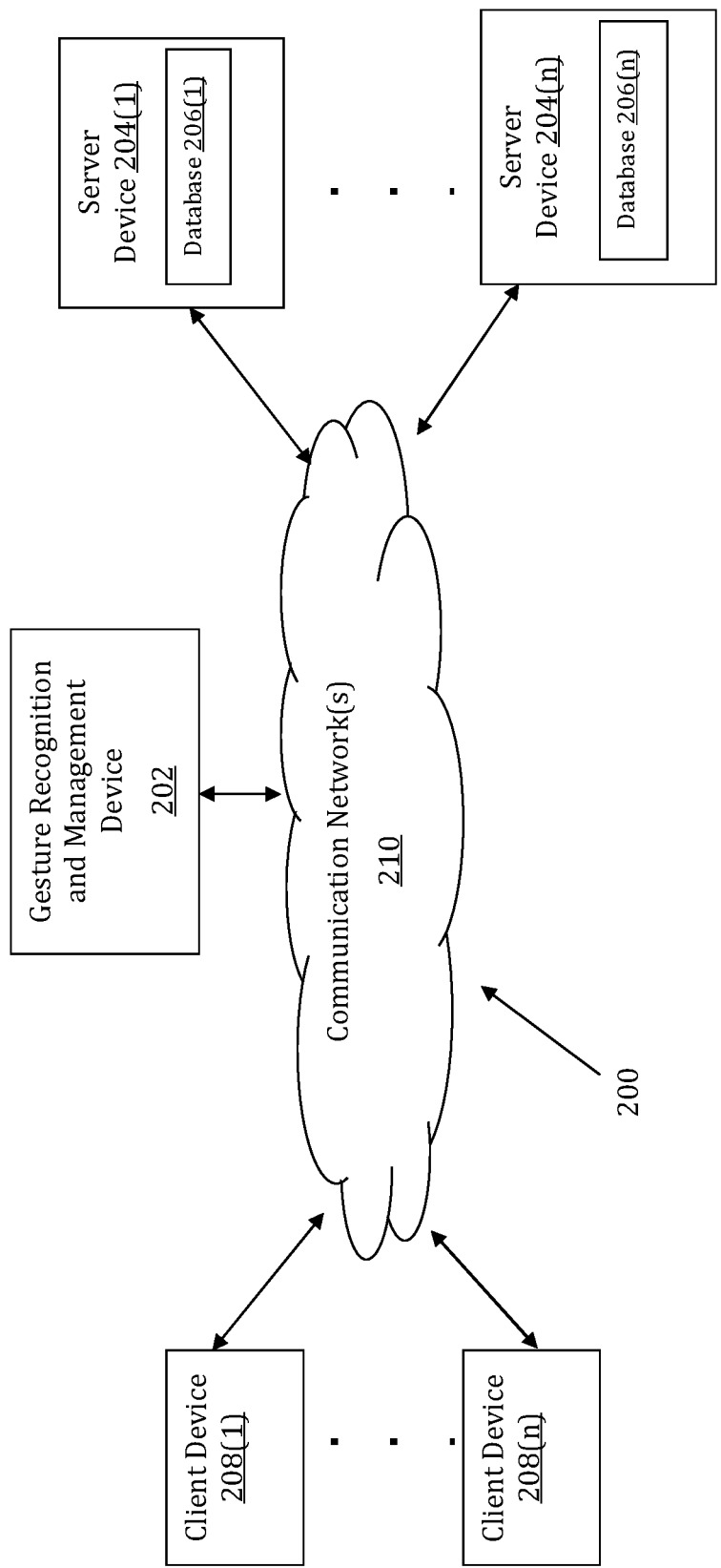
FIG. 2 illustrates an exemplary diagram of a network environment.

Referring to FIG. 2, a schematic of an exemplary network environment 200 for implementing a method for facilitating gesture recognition via a wearable device to initiate actions on an associated computing device is illustrated. In an exemplary embodiment, the method is executable on any networked computer platform, such as, for example, a personal computer (PC).

The method for facilitating gesture recognition via a wearable device to initiate actions on an associated computing device may be implemented by a Gesture Recognition and Management (GRM) device 202. The GRM device 202 may be the same or similar to the computer system 102 as described with respect to FIG. 1. The GRM device 202 may store one or more applications that can include executable instructions that, when executed by the GRM device 202, cause the GRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GRM device 202 itself, may be located in virtual server(s) running in a cloud-based computing environment rather than being tied to one or more specific physical network computing devices. Also, the application(s) may be running in one or more virtual machines (VMs) executing on the GRM device 202. Additionally, in one or more embodiments of this technology, virtual machine(s) running on the GRM device 202 may be managed or supervised by a hypervisor.

In the network environment 200 of FIG. 2, the GRM device 202 is coupled to a plurality of server devices 204(1)-204(n) that hosts a plurality of databases 206(1)-206(n), and also to a plurality of client devices 208(1)-208(n) via communication network(s) 210. A communication interface of the GRM device 202, such as the network interface 114 of the computer system 102 of FIG. 1, operatively couples and communicates between the GRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and GRM devices that efficiently implement a method for facilitating gesture recognition via a wearable device to initiate actions on an associated computing device.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The GRM device 202 may be a standalone device or integrated with one or more other devices or apparatuses, such as one or more of the server devices 204(1)-204(n), for example. In one particular example, the GRM device 202 may include or be hosted by one of the server devices 204(1)-204(n), and other arrangements are also possible. Moreover, one or more of the devices of the GRM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GRM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to sensor data, orientation data, gesture data, mapping data, predetermined action data, and notification data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the GRM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the GRM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the GRM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GRM device 202, the server devices 204(1)-204(n), or the client devices 208(1)-208(n), for example, may be configured to operate as virtual instances on the same physical machine. In other words, one or more of the GRM device 202, the server devices 204(1)-204(n), or the client devices 208(1)-208(n) may operate on the same physical device rather than as separate devices communicating through communication network(s) 210. Additionally, there may be more or fewer GRM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
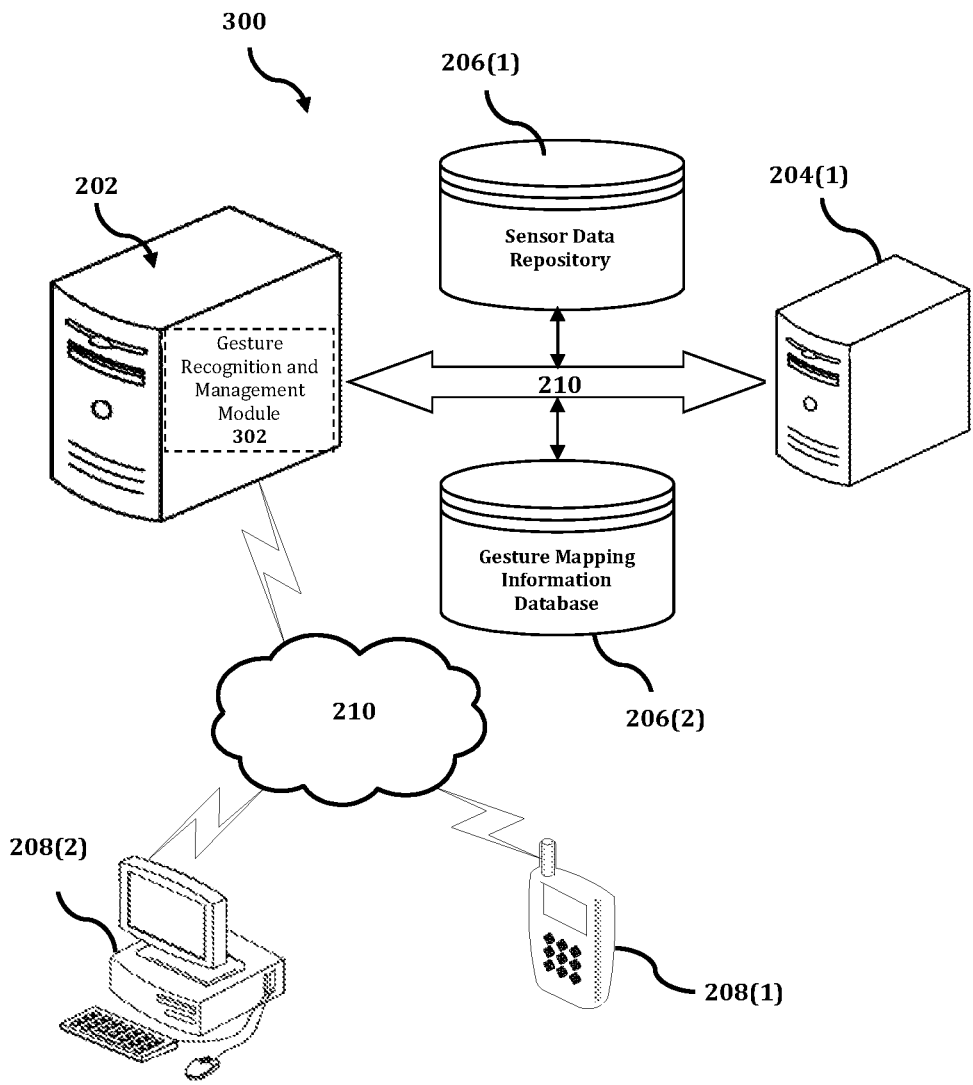
FIG. 3 shows an exemplary system for implementing a method for facilitating gesture recognition via a wearable device to initiate actions on an associated computing device.

The GRM device 202 is described and shown in FIG. 3 as including a gesture recognition and management module 302, although it may include other rules, policies, modules, databases, or applications, for example. As will be described below, the gesture recognition and management module 302 is configured to implement a method for facilitating gesture recognition via a wearable device to initiate actions on an associated computing device.

An exemplary process 300 for implementing a mechanism for facilitating gesture recognition via a wearable device to initiate actions on an associated computing device by utilizing the network environment of FIG. 2 is shown as being executed in FIG. 3. Specifically, a first client device 208(1) and a second client device 208(2) are illustrated as being in communication with GRM device 202. In this regard, the first client device 208(1) and the second client device 208(2) may be "clients" of the GRM device 202 and are described herein as such. Nevertheless, it is to be known and understood that the first client device 208(1) and/or the second client device 208(2) need not necessarily be "clients" of the GRM device 202, or any entity described in association therewith herein. Any additional or alternative relationship may exist between either or both of the first client device 208(1) and the second client device 208(2) and the GRM device 202, or no relationship may exist.

Further, GRM device 202 is illustrated as being able to access a sensor data repository 206(1) and a gesture mapping information database 206(2). The gesture recognition and management module 302 may be configured to access these databases for implementing a method for facilitating gesture recognition via a wearable device to initiate actions on an associated computing device.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the GRM device 202 via broadband or cellular communication. Of course, these embodiments are merely exemplary and are not limiting or exhaustive.

Upon being started, the gesture recognition and management module 302 executes a process for facilitating gesture recognition via a wearable device to initiate actions on an associated computing device. An exemplary process for facilitating gesture recognition via a wearable device to initiate actions on an associated computing device is generally indicated at flowchart 400 in FIG. 4.

Figure 4:
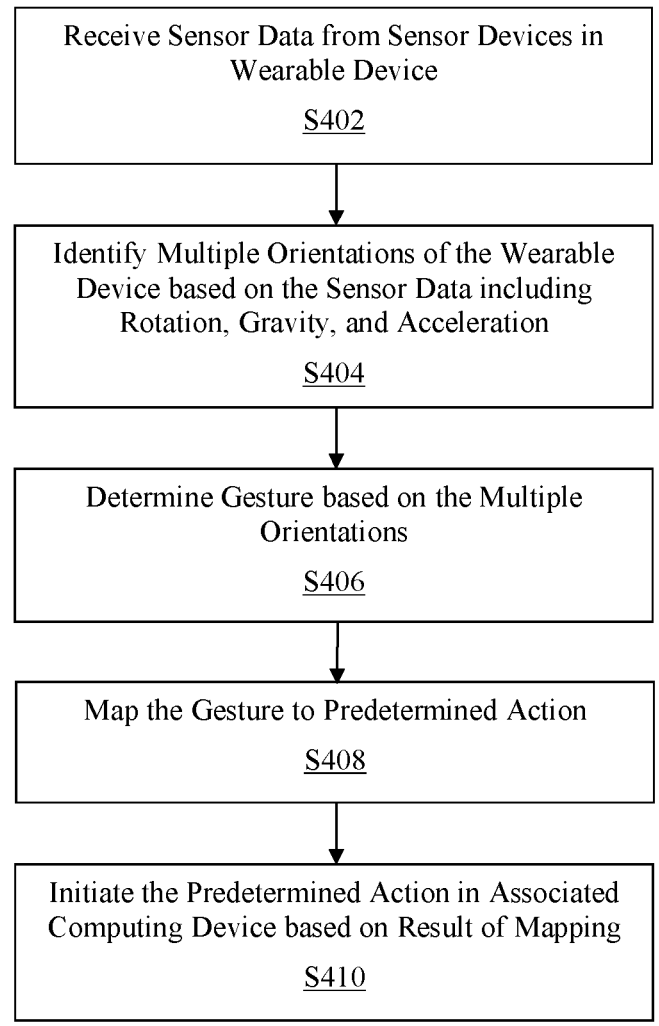
FIG. 4 is a flowchart of an exemplary process for implementing a method for facilitating gesture recognition via a wearable device to initiate actions on an associated computing device.

In the process 400 of FIG. 4, at step S402, sensor data from a sensor device that is incorporated into a wearable device may be received. The sensor data may be received from at least one sensor device in the wearable device. In an exemplary embodiment, the wearable device may relate to a computing device that is worn close to and/or on the surface of the skin. The wearable device may include at least one from among a set of wired headphones, a set of wireless headphones, a pair of smart eyeglasses, and a smart watch. In another exemplary embodiment, the headphones may relate to a pair of small loudspeaker drivers that are worn on or around the ears of a user. The headphones are electroacoustic transducers, which convert an electrical signal to a corresponding sound.

In another exemplary embodiment, the sensor device may relate to at least one from among a module, a machine, and a subsystem that detects events and/or changes in an operating environment. The sensor device may include at least one from among a gyroscope, a magnetometer, and an accelerometer. In another exemplary embodiment, the sensor device may enable functionalities on the wearable device. For example, wireless headphones that incorporate optical sensors may use the optical sensors to detect user taps to play or pause audio. Similarly, wireless headphones that incorporate accelerometers may detect placement on the ear to automatically pause audio when the user removes the headphones.

At step S404, an orientation of the wearable device may be identified based on the sensor data. The orientation may relate to a relative position of the wearable device. In an exemplary embodiment, the orientation of the wearable device may include a description of how the wearable device is placed in the space that it occupies. For example, headphones sensor data may indicate that the headphones are tilted along a particular axis in a three-dimensional reference frame. In another exemplary embodiment, the orientation of the wearable device may be identified from sensor data that is received from any combination of sensor devices. For example, sensor data from gyroscopes and three-axis accelerometers may be used in combination to identify as well as verify the orientation of the wearable device.

At step S406, a gesture may be determined based on the identified orientation via an application programming interface. The gesture may also be determined based on a combination of the identified orientation and the sensor data. In an exemplary embodiment, the gesture may relate to a form of non-verbal communication wherein bodily actions are used to communicate messages. The gestures may correspond to a movement of the hands, face, and/or other parts of the body. The gestures may include at least one from among a tilt gesture, a rotate gesture, and a shake gesture. In another exemplary embodiment, the gesture may be determined based on a combination of wearable device orientations over a predetermined period of time. For example, a combination of headphone orientations over the course of a predetermined period of time may be used to determine a headshaking gesture.

In another exemplary embodiment, the application programming interface (API) may relate to a connection between computer programs. The API may include a type of software interface that offers a service to other pieces of software programs. The API may correspond to a software intermediary that enables communication between two software programs. In another exemplary embodiment, the API may be used to interface with the wearable device to facilitate gesture determination. For example, an API such as CMHeadphoneMotionManager may be used to translate gyroscopic data, magnetometer data, and accelerometer data into supported head gestures such as tilt, rotate, and/or shake.

At step S408, the determined gesture may be mapped to a predetermined action. In an exemplary embodiment, the predetermined action may relate to user actions within an application. The predetermined action may include at least one from among a load document action, an undo action, a scroll page action, a select annotation tool action, and a file transfer action. For example, the predetermined action may correspond to a scroll page action in an application such as BOARDROOM.

In another exemplary embodiment, the predetermined action may relate to user actions within a first application that is usable in a second application. For example, the predetermined action may relate to a page scrolling action in an accessibility application that is usable to move pages of a document in a word processing application. As will be appreciated by a person of ordinary skill in the art, use of the predetermined action between a plurality of applications may provide alternative interaction mechanisms to improve accessibility of any particular application. In another exemplary embodiment, user actions within the first application that is usable in the second application may facilitate control of internet of things (IoT) devices. For example, a headphone gesture may be usable to facilitate control of smart lighting features.

At step S410, the predetermined action may be initiated in an associated computing device. The predetermined action may be initiated via a communication interface based on a result of the mapping. In an exemplary embodiment, the associated computing device may correspond to at least one from among a mobile computing device as well as a desktop computing device. For example, the predetermined action may be initiated on a mobile computing device such as a cell phone as well as initiated on a desktop computing device such as a user terminal. In another exemplary embodiment, the association between the wearable device and the computing device may be predetermined by the user. For example, the user may pair the wireless headphone with the user terminal for gesture recognition and management consistent with disclosures in the present application.

In another exemplary embodiment, the communication interface may correspond to a communication standard that is usable to transmit data between the wearable device and the associated computing device. The communication interface may include a wired data transmission protocol, a long-range wireless data transmission protocol, as well as a short-range wireless data transmission protocol such as, for example, BLUETOOTH that is used to exchange data between fixed computing devices and mobile computing devices.

In another exemplary embodiment, the communication interface may include the primary communication method employed by the wearable device to facilitate functionalities of the wearable device. For example, the communication interface may correspond to the same BLUETOOTH communication protocol that is used by the headphones to receive audio data. In another exemplary embodiment, the communication interface may include a secondary communication method. For example, the communication interface may utilize a wireless network protocol such as a wireless fidelity (Wi-Fi) protocol while the headphones utilize the BLUETOOTH communication protocol to receive audio data.

In another exemplary embodiment, the mapping of the gesture may be based on a user preference. A request may be received from the user via a graphical user interface. The request may include a new predetermined action and corresponding mapping information. The new predetermined action may be extracted from the request and mapped to the gesture by using the mapping information. Then, a notification may be generated based on a result of the mapping. The notification may include data that relates to at least one from among the new predetermined action, the mapping information, and the result of the mapping. The notification may be displayed via the graphical user interface in response to the user request.

In another exemplary embodiment, a machine learning model may be implemented to facilitate the gesture recognition process. To implement the machine learning model, sensor data may be aggregated from a plurality of users. The sensor data may be aggregated automatically from the plurality of users via the corresponding wearable device. Feedback data may also be requested from each of the plurality of users via a graphical user interface. The feedback data may include an accuracy rating for the identified orientations and the determined gestures. For example, a user device such as a mobile phone that is connected to the wearable device may receive a prompt that requests feedback from a user. The feedback may include information that relates to the accuracy of the gesture recognition, user preferences, and user satisfaction.

Then, training data sets may be generated based on the sensor data and the feedback data. The training data sets may include data that is enriched by using data labeling and data annotations. Data labeling may relate to a process of identifying raw data and adding one or more meaningful and informative labels to provide context. Similarly, data annotations may correspond to a process of tagging raw data to augment data elements with informative tags. Next, a model may be trained by using the generated training data sets. Consistent with present disclosures, the training data sets may relate to preprocessed data that is usable to train an algorithm and/or a model to predict an outcome. The training data sets may be usable by the model to create and refine rules. Finally, the trained model may be automatically evaluated based on a plurality of metrics such as, for example, accuracy and performance metrics.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, consistent with present disclosures, the model may be directly usable to identify an orientation of the wearable device based on the sensor data. The model may evaluate the sensor data together with a pattern of user behaviors to improve efficiency and accuracy of the orientation identification process. For example, in situations where the received sensor data is insufficient to determine an orientation of the wearable device, the model may utilize the pattern of user behaviors to predictively identify the orientation. Similarly, in another exemplary embodiment, the model may be directly usable to determine a gesture based on the identified orientation. The model may evaluate the identified orientation together with the pattern of user behaviors to improve efficiency and accuracy of the gesture determination process. For example, in situations where an identified orientation is insufficient to determine a gesture, the model may utilize the pattern of user behaviors to predictively determine the gesture.

In another exemplary embodiment, the model may be usable to define and set thresholds that facilitate identification of wearable device orientation and determination of a corresponding gesture. To facilitate the identification and determination process, the model may receive sensor data from a user as input and output a set of thresholds that correspond to the user. The model may be used to identify unique characteristics of the user based on a pattern of user behaviors. The unique characteristics of the user may relate to user idiosyncrasies that varies from one user to another. For example, user A may normally shake his head while he talks while user B keeps her head still as she talks. By dynamically adjusting orientation thresholds and gesture thresholds using the model, more accurate identification of wearable device orientations and determination of gestures may be achieved.

Accordingly, with this technology, an optimized process for facilitating gesture recognition via a wearable device to initiate actions on an associated computing device is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating gesture recognition via a wearable device, the method being implemented by at least one processor, the method comprising:

receiving, by the at least one processor, sensor data from a plurality of sensor devices that is incorporated into the wearable device, wherein the wearable device is a set of headphones, and wherein the plurality of sensor devices included in the set of headphones includes at least optical sensors, a gyroscope and an accelerometer, wherein the set of headphones is configured to utilize the optical sensors to detect one or more taps made by a user of the wearable device, and wherein the one or more taps detected by the optical sensors causes the wearable device to play or pause audio;

detecting, via the accelerometer included in the set of headphones, a worn status of the set of headphones, and performing an audio control based on the worn status of the set of headphones, wherein the audio control includes pausing of an audio signal when the set of headphones is detected as being removed from the user based on a reading by the accelerometer;

identifying, by the at least one processor, a plurality of orientations of the wearable device based on the sensor data provided by a combination of the gyroscope and the accelerometer among the plurality of sensor devices, wherein each of the plurality of orientations relates to a relative position of the wearable device indicating a tilt along a particular axis in a three-dimensional reference frame;

determining, by the at least one processor via an application programming interface, at least one gesture based on the plurality of orientations of the wearable device identified, wherein the at least one gesture is determined based on a change of the plurality of orientations of the wearable device identified over a course of a predetermined period of time, and wherein the change of the plurality of orientations over the course of the predetermined period of time correspond to a headshaking gesture;

mapping, by the at least one processor, the at least one gesture to at least one predetermined action, wherein the at least one gesture is the headshaking gesture, and wherein the at least one predetermined action is at least one of a load document action, an undo action, a scroll page action, a select annotation tool action, and a file transfer action;

initiating, by the at least one processor via a communication interface and in response to the headshaking gesture, the at least one of the load document action, the undo action, the scroll page action, the select annotation tool action and the file transfer action in an associated computing device that is separate from the set of headphones based on a result of the mapping, wherein the associated computing device is a desktop computing device, and wherein the at least one predetermined action is a user action in a first application that is usable to in a second application;

aggregating, by the at least one processor, the sensor data from a plurality of users;

requesting, by the at least one processor via a graphical user interface, feedback data from each of the plurality of users, the feedback data including an accuracy rating for the identified plurality of orientations and the determined at least one gesture;

generating, by the at least one processor, at least one training data set based on the sensor data and the feedback data, the at least one training data set including data that is enriched by using data labeling and data annotation;

training, by the at least one processor, at least one model by using the at least one training data set; and automatically evaluating, by the at least one processor, the trained at least one model based on at least one metric, wherein the data labeling relates to a process of identifying raw data and adding one or more labels to provide context, wherein the data annotation corresponds to a process of tagging the raw data to augment a data element with a tag, wherein the at least one training data set further relates to preprocessed data that is usable to train the at least one model to predict an outcome, wherein the training data set is used by the at least one model to create and refine rules, and wherein the at least one metric includes accuracy and performance metrics.

2. The method of claim 1, wherein the wearable device further includes a pair of smart eyeglasses.

3. The method of claim 1, further comprising:
receiving, by the at least one processor via a graphical user interface, at least one request from a user, the at least one request including at least one new predetermined action and mapping information;

mapping, by the at least one processor using the mapping information, the at least one new predetermined action to the at least one gesture;

generating, by the at least one processor, at least one notification, the at least one notification including data that relates to at least one from among the at least one new predetermined action, the mapping information, and a result of the mapping; and displaying, by the at least one processor via the graphical user interface, the at least one notification in response to the at least one request.

4. The method of claim 1, further comprising:
identifying, by the at least one processor using the trained at least one model, the plurality of orientations based on the sensor data; and determining, by the at least one processor using the trained at least one model, the at least one gesture based on the plurality of orientations.

5. The method of claim 1, wherein the at least one model includes at least one from among a machine learning model, a mathematical model, a process model, and a data model.

6. A computing device configured to implement an execution of a method for facilitating gesture recognition via a wearable device, the computing device comprising:
a processor;
a memory; and
a communication interface coupled to each of the processor and the memory,
wherein the processor is configured to:
receive sensor data from a plurality of sensor devices that is incorporated into the wearable device, wherein the wearable device is a set of headphones, and wherein the plurality of sensor devices included in the set of headphones includes at least optical sensors, a gyroscope and an accelerometer, wherein the set of headphones is configured to utilize the optical sensors to detect one or more taps made by a user of the wearable device, and wherein the one or more taps detected by the optical sensors causes the wearable device to play or pause audio;

detect, via the accelerometer included in the set of headphones, a worn status of the set of headphones, and performing an audio control based on the worn status of the set of headphones, wherein the audio control includes pausing of an audio signal when the set of headphones is detected as being removed from the user based on a reading by the accelerometer;

identify a plurality of orientations of the wearable device based on the sensor data that is provided by a combination of the gyroscope and the accelerometer, wherein each of the plurality of orientations relates to a relative position of the wearable device indicating a tilt along a particular axis in a three-dimensional reference frame;

determine, via an application programming interface, at least one gesture based on the plurality of orientations of the wearable device identified, wherein the at least one gesture is determined based on a change of the plurality of orientations of the wearable device identified over a course of a predetermined period of time, and wherein the change of the plurality of orientations over the course of the predetermined period of time correspond to a headshaking gesture;

map the at least one gesture to at least one predetermined action, wherein the at least one gesture is the headshaking gesture, and wherein the at least one predetermined action is at least one of a load document action, an undo action, a scroll page action, a select annotation tool action, and a file transfer action;

initiate, via a communication interface and in response to the headshaking gesture, the at least one of the load document action, the undo action, the scroll page action, the select annotation tool action and the file transfer action in an associated computing device that is separate from the set of headphones based on a result of the mapping, wherein the associated computing device is a desktop computing device, and wherein the at least one predetermined action is a user action in a first application that is usable to in a second application; and aggregate the sensor data from a plurality of users;

request, via a graphical user interface, feedback data from each of the plurality of users, the feedback data including an accuracy rating for the identified plurality of orientations and the determined at least one gesture;

generate at least one training data set based on the sensor data and the feedback data, the at least one training data set including data that is enriched by using data labeling and data annotation;

train at least one model by using the at least one training data set; and automatically evaluate the trained at least one model based on at least one metric, wherein the data labeling relates to a process of identifying raw data and adding one or more labels to provide context, wherein the data annotation corresponds to a process of tagging the raw data to augment a data element with a tag, wherein the at least one training data set further relates to preprocessed data that is usable to train the at least one model to predict an outcome, wherein the training data set is used by the at least one model to create and refine rules, and wherein the at least one metric includes accuracy and performance metrics.

7. The computing device of claim 6, wherein the wearable device further includes a pair of smart eyeglasses.

8. The computing device of claim 6, wherein the processor is further configured to:

receive, via a graphical user interface, at least one request from a user, the at least one request including at least one new predetermined action and mapping information;

map, by using the mapping information, the at least one new predetermined action to the at least one gesture;

generate at least one notification, the at least one notification including data that relates to at least one from among the at least one new predetermined action, the mapping information, and a result of the mapping; and display, via the graphical user interface, the at least one notification in response to the at least one request.

9. The computing device of claim 6, wherein the processor is further configured to:

identify, by using the trained at least one model, the plurality of orientations based on the sensor data; and determine, by using the trained at least one model, the at least one gesture based on the plurality of orientations.

10. The computing device of claim 6, wherein the at least one model includes at least one from among a machine learning model, a mathematical model, a process model, and a data model.

11. A non-transitory computer readable storage medium storing instructions for facilitating gesture recognition via a wearable device, the storage medium comprising executable code which, when executed by a processor, causes the processor to:

receive sensor data from a plurality of sensor devices that is incorporated into the wearable device, wherein the wearable device is a set of headphones, and wherein the plurality of sensor devices included in the set of headphones includes at least optical sensors, a gyroscope and an accelerometer, wherein the set of headphones is configured to utilize the optical sensors to detect one or more taps made by a user of the wearable device, and wherein the one or more taps detected by the optical sensors causes the wearable device to play or pause audio;

detect, via the accelerometer included in the set of headphones, a worn status of the set of headphones, and performing an audio control based on the worn status of the set of headphones, wherein the audio control includes pausing of an audio signal when the set of headphones is detected as being removed from the user based on a reading by the accelerometer;

identify a plurality of orientations of the wearable device based on the sensor data that is provided by a combination of the gyroscope and the accelerometer, wherein each of the plurality of orientations relates to a relative position of the wearable device indicating a tilt along a particular axis in a three-dimensional reference frame;

determine, via an application programming interface, at least one gesture based on the plurality of orientations of the wearable device identified, wherein the at least one gesture is determined based on a change of the plurality of orientations of the wearable device identified over a course of a predetermined period of time, and wherein the change of the plurality of orientations over the course of the predetermined period of time correspond to a headshaking gesture;

map the at least one gesture to at least one predetermined action, wherein the at least one gesture is the headshaking gesture, and wherein the at least one predetermined action is at least one of a load document action, an undo action, a scroll page action, a select annotation tool action, and a file transfer action; and initiate, via a communication interface and in response to the headshaking gesture, the at least one of the load document action, the undo action, the scroll page action, the select annotation tool action and the file transfer action in an associated computing device that is separate from the set of headphones based on a result of the mapping, wherein the associated computing device is a desktop computing device, and wherein the at least one predetermined action is a user action in a first application that is usable to in a second application;

aggregate the sensor data from a plurality of users;

request, via a graphical user interface, feedback data from each of the plurality of users, the feedback data including an accuracy rating for the identified plurality of orientations and the determined at least one gesture;

generate at least one training data set based on the sensor data and the feedback data, the at least one training data set including data that is enriched by using data labeling and data annotation;

train at least one model by using the at least one training data set; and automatically evaluate the trained at least one model based on at least one metric, wherein the data labeling relates to a process of identifying raw data and adding one or more labels to provide context, wherein the data annotation corresponds to a process of tagging the raw data to augment a data element with a tag, wherein the at least one training data set further relates to preprocessed data that is usable to train the at least one model to predict an outcome, wherein the training data set is used by the at least one model to create and refine rules, and wherein the at least one metric includes accuracy and performance metrics.

12. The storage medium of claim 11, wherein the wearable device further includes a pair of smart eyeglasses.

* * * * *